Patented Nov. 12, 1935

2,020,791

UNITED STATES PATENT OFFICE 2,020,791

BRAKE COMPOSITIONS

James Norman Longley, Chapel-en-le-Frith, England, assignor to Ferodo Limited, Chapel-en-le-Frith, England, a British company No Drawing. Application August 28, 1931, Serial No. 560,051. In Great Britain April 16, 1931

9 Claims. (Cl. 106—7.5)

This invention relates to compositions for use as brake blocks or braking surfaces.

It is well known that friction linings as at present made have the disadvantage that when subjected to water, their coefficient of friction falls very considerably until the water has been cleared away from the friction surface, when the original dry coefficient of friction is restored. In some cases, the fall in the coefficient of friction is rapid and there is a correspondingly rapid rise when the water is cleared away; in other cases, the coefficient of friction falls slowly but there is a correspondingly slow rate of recovery due to the difficulty of clearing the water away from the friction surface. It will be appreciated that where brakes are exposed to wet and to dry conditions, and where the change from the one to the other may occur suddenly and frequently, the effect on the braking capacity or efficiency of the brake material becomes an important consideration.

The object of my present invention is to provide a brake composition or material, the coefficient of friction of which may be substantially unaffected by water, such composition or material also having good wearing properties and not causing abrasion or excessive wear of the surfaces to which it is applied.

I have found by careful research and experiment that when the usual composition brake blocks containing a binder such as resin and a body such as asbestos with or without additional materials are applied to brake drums, though the latter appear to be maintained in a clean condition by the brakes, there are in fact adhesions of colloidal matter upon the drum. I have further found that on a braking surface so contaminated with colloidal matter, water placed thereon remains in locally thick patches and streaks, forming a lubricating film difficult for the braking medium to disrupt and dry, so preventing efficient braking.

My invention comprises a brake composition consisting of a non-metallic finely divided water-insoluble body in a suitable binder, the proportion of body to binder being such that wear of the block is continuous during brake application, so that a fresh braking surface is being continuously presented to the surface or drum being braked, the product of wear being such that it acts whilst being dissipated to clean the braked surface of all colloidal matter so that water whether in large or small quantities will flow evenly thereoff, leaving only a comparatively thin film which can be readily disrupted by the product of wear and evaporated finally by the heat of rubbing.

In the application of my invention, the non-metallic finely divided water-insoluble body or filler may be any finely divided inert non-metallic inorganic filler, such as kieselguhr or other diatomaceous earth, tripoli or rottenstone, asbestos powder or the like. The particle size of the body should be large enough to enable it to clear the brake drum or surface of all colloidal matter, when due to wear the particles are freed from the brake block and driven off from between the block and the braked surface. It should also be able to disrupt the very thin water film which adheres to the brake drum surface. The particle size should not be too large or the volume or rate of wear may be serious. Diatomaceous earths are bodies with a very suitable particle size for efficient service. As an example, it may be noted that chemically precipitated calcium carbonate is too fine to clear the brake drum of colloidal matter and to disrupt the water film when formed into a block by means of a binder as its particle size is too nearly colloidal; it is not therefore suitable for the production of a brake composition in accordance with my invention. The particle size of the diatomaceous earth which I have hitherto employed averages from 15 to 20 microns, and that of chemically precipitated calcium carbonate, which I have referred to as being of too small a particle size to be effective has a particle size on an average of 1½ microns (one and a half microns).

The binder may consist of rubber, phenol formaldehyde or other similar condensation product. Condensation products are the most suitable by reason of the fact that they are rendered effective binders by combined heat and pressure.

The body and binder are mixed together in the form of finely divided powders in such proportion as to allow of a certain rate of wear. For this purpose, the proportion of binder is kept low whereby I ensure that the product of wear is sufficient to clear the braked surface of all colloidal matter and to disrupt the thin water film which may be between the friction surface and the braked surface to which it is applied. In practice, I have found that the best practical results having regard to the desirability of limiting the rate of wear can be obtained when from 1 part by volume of binder is mixed with 5 to 7 parts of body. As an example, a brake composition consists of:—

| | Grams |
|---|---|
| Rottenstone (specific gravity 2.48) | 307 |
| Synthetic resin (specific gravity 1.26) | 30 |

By volume the mixture is:—

| | Cubic centimeters |
|---|---|
| Rottenstone | 124 |
| Synthetic resin | 23.8 |

If a body or a binder be used having a different specific gravity, a corresponding variation in the weight of such material used in the mixing should be made to give the indicated approximate volume ratios which I find to be of the greatest importance in ensuring the production of a successful product for use under wet conditions.

The mixture of body and synthetic resin binder is consolidated by heat and pressure in order to render the binder infusible. The pressure employed may be of the order of 4 to 5 tons per square inch of surface. By this means, the small binder content employed is rendered as effective as possible. The temperature employed for rendering the synthetic resin infusible should be above 280° F., preferably 350° F.

The brake composition produced as before described is of weak physical strength; it is preferably reinforced by incorporating therein long fiber asbestos. The volume of the latter should not be more than about 6.5 ccs. to 124 ccs. of body in the example hereinbefore set out, that is, about 1 part by volume of fiber to 19 parts of body. As the specific gravity of asbestos is 2.26, this signifies the addition of 15 grams to the 307 grams of rottenstone. Other fibers instead of asbestos may be used, the weight used being adjusted in accordance with their specific gravity to give a volume ratio such as herein indicated. The addition of asbestos or other fibers reduces the coefficient of friction of the brake composition under wet conditions; the volume added may, therefore, be adjusted to control the wet coefficient of friction for any set circumstances, particularly for any ratio of friction surface to drum surface to which the friction material is applied. If no long asbestos fiber is contained in the brake composition, the coefficient of friction may be higher when water is present than when it is absent.

By employing as a body, a non-abrasive and non-metallic material, I avoid scoring and excessive wear of brake drums and other disadvantages associated with the use of metals especially in connection with electrically driven vehicles. By using a body with an appropriate particle size, such as that of diatomaceous earth, and a low percentage by volume of binder, I ensure a low rate of wear whilst obtaining that continuity of wear and exposure of a fresh surface for wear with cleaning of the braked surface and disruption of the water film by the product of wear, which is essential for successful results.

A brake composition in accordance with my invention will not have its braking qualities materially affected even if the braking surface be contaminated with small quantities of oil and grease from an extraneous source, such as from the rails on which the wheels which are being braked, run.

What I claim is:—

1. A process of making brake composition, consisting in mixing one part by volume of a synthetic resin binder in finely divided form and 5 to 7 parts by volume of a non-metallic inorganic and inert finely divided water-insoluble filler having an average particle size not less than that of diatomaceous earth, and consolidating the mixture by heating to a temperature above 280° F., and by a compression pressure of about 4 to 5 tons per square inch of surface.

2. A brake composition comprising a non-metallic, inert, inorganic, finely divided, water insoluble siliceous earth body having an average particle size of not less than five microns and a binder consolidated by heat and pressure, in the proportion of not less than five parts and not more than seven parts by volume of the former to one part by volume of the latter, the said composition having substantially the same coefficient of friction when wet as when dry.

3. A brake composition comprising a non-metallic inert, inorganic, finely divided, water insoluble siliceous earth body having an average particle size of not less than five microns and a binder consolidated by heat and pressure, in the proportion of not less than five parts and not more than seven parts by volume of the former to one part by volume of the latter, together with fibrous material not exceeding in volume about one-nineteenth of the total volume of the composition, the said composition having substantially the same coefficient of friction when wet as when dry.

4. A brake composition comprising diatomaceous earth and a synthetic resin binder consolidated by heat and pressure, in the proportion of not less than five parts and not more than seven parts by volume of the former to one part by volume of the latter.

5. A brake composition according to claim 4 comprising also long fibre asbestos in amount not exceeding one nineteenth of the total volume of the mixture.

6. A brake composition comprising diatomaceous earth and a synthetic resin binder consolidated by heat and pressure, in the proportion of not less than five parts, and not more than seven parts by volume of the former to one part by volume of the latter, the said composition having substantially the same coefficient of friction when wet as when dry.

7. A brake composition according to claim 6 comprising also long fiber asbestos in amount not exceeding one nineteenth of the total volume of the mixture.

8. A process of making a brake composition, consisting in mixing one part by volume of a synthetic resin binder in finely divided form and 5 to 7 parts by volume of non-metallic inorganic and inert finely divided water insoluble filler having an average particle size not less than that of diatomaceous earth, together with fibrous material not exceeding in volume about one-nineteenth of the total volume of the composition and consolidating the mixture by heating to a temperature above 280° F., and by a compression pressure of about 4 to 5 tons per square inch of surface.

9. A process of making a brake composition, consisting in mixing a synthetic resin binder with a non-metallic inorganic and inert, water-insoluble siliceous earth filler having an average particle size not less than that of diatomaceous earth, both filler and binder being in finely divided form, and consolidating the mixture by heating to a temperature above 280° F., and by a compression pressure of about 4 to 5 tons per square inch of surface; a preponderating proportion by volume of filler to binder being used in the composition.

JAMES NORMAN LONGLEY.